(12) United States Patent
Halbig et al.

(10) Patent No.: US 7,819,479 B2
(45) Date of Patent: Oct. 26, 2010

(54) VEHICLE SEAT ASSEMBLY HAVING WALK-IN AND FOLD-FLAT FEATURES

(75) Inventors: Michael Halbig, Greding (DE); Martin Stanner, Buch am Buchrain (DE); Andreas Thiex, Heilbach (DE)

(73) Assignee: Lear Corporation, Southfield, MI (US)

( * ) Notice: Subject to any disclaimer, the term of this patent is extended or adjusted under 35 U.S.C. 154(b) by 277 days.

(21) Appl. No.: 11/870,069

(22) Filed: Oct. 10, 2007

(65) Prior Publication Data

US 2009/0096270 A1    Apr. 16, 2009

(51) Int. Cl.
*B60N 2/06* (2006.01)
*B60N 2/20* (2006.01)

(52) U.S. Cl. .............. 297/378.14; 297/378.12; 297/341

(58) Field of Classification Search .......... 297/341, 297/378.1, 378.12, 378.13, 378.14, 452.14, 297/452.65
See application file for complete search history.

(56) References Cited

U.S. PATENT DOCUMENTS

| | | | |
|---|---|---|---|
| 4,775,186 A | 10/1988 | Nishino | |
| 4,781,353 A | 11/1988 | Nishino | |
| 4,909,570 A | 3/1990 | Matsuhashi | |
| 5,161,856 A | 11/1992 | Nishino | |
| 5,224,759 A * | 7/1993 | Matsuura et al. | 297/367 R |
| 5,664,837 A | 9/1997 | Takagi | |
| 5,695,247 A * | 12/1997 | Premji | 297/378.14 X |
| 6,139,104 A * | 10/2000 | Brewer | 297/353 |
| 6,585,321 B1 | 7/2003 | Taguchi et al. | |
| 6,659,557 B2 * | 12/2003 | Deptolla | 297/367 R |
| 6,767,063 B1 * | 7/2004 | Abdella et al. | 297/378.12 |
| 6,767,068 B1 | 7/2004 | Fujii et al. | |
| 6,817,646 B2 | 11/2004 | Kikuchi et al. | |
| 6,827,404 B2 | 12/2004 | Blair et al. | |
| 6,857,613 B2 | 2/2005 | Yokota | |
| 6,857,702 B2 * | 2/2005 | Becker et al. | 297/341 |
| 6,860,562 B2 * | 3/2005 | Bonk | 297/378.12 |
| 6,926,362 B2 * | 8/2005 | Kroner et al. | 297/354.12 |
| 6,926,364 B2 | 8/2005 | Cooley et al. | |
| 6,935,691 B1 | 8/2005 | Sasaki et al. | |
| 6,986,493 B2 | 1/2006 | Yokota | |
| 7,021,716 B2 | 4/2006 | Persad et al. | |
| 7,025,419 B2 * | 4/2006 | Sasaki et al. | 297/378.14 X |
| 7,066,539 B2 | 6/2006 | Hatta et al. | |
| 7,172,253 B2 * | 2/2007 | Haverkamp | 297/378.1 |
| 7,255,398 B2 * | 8/2007 | Tokui et al. | 297/367 R |

(Continued)

*Primary Examiner*—Rodney B. White
*Assistant Examiner*—James Alex
(74) *Attorney, Agent, or Firm*—Brooks Kushman P.C.

(57) ABSTRACT

A vehicle seat assembly having a sliding seat bottom, a slide lock mechanism, a seat back pivotally mounted to the seat bottom, a pivot lock mechanism, a walk-in pivot release actuator, a fold-flat pivot release actuator and a blocking member. The blocking member moves between first, second and neutral positions. The blocking member is connected to the slide lock mechanism and the fold-flat pivot release actuator. The seat back moves the blocking member from the neutral position to the first position when the walk-in pivot release actuator is actuated and the seat back pivots forward. The blocking member unlocks the slide lock release mechanism when the blocking member is in the first position. The fold-flat release actuator, when actuated, moves the blocking member from the neutral position to the second position. The blocking member does not obstruct the seat back from pivoting forward when in the second position.

20 Claims, 6 Drawing Sheets

U.S. PATENT DOCUMENTS

| | | | |
|---|---|---|---|
| 7,410,217 B2 * | 8/2008 | Inoue et al. | 297/378.13 |
| 7,490,900 B2 * | 2/2009 | Szczudrawa | 297/284.9 |
| 7,517,022 B2 * | 4/2009 | Habedank et al. | 297/378.12 |
| 7,533,937 B2 * | 5/2009 | Becker et al. | 297/378.14 |
| 7,686,398 B2 * | 3/2010 | Yokoyama | 297/341 |
| 2004/0021355 A1 * | 2/2004 | Ohba | 297/341 |
| 2004/0070250 A1 | 4/2004 | Cooley et al. | |
| 2004/0075323 A1 | 4/2004 | Blair et al. | |
| 2004/0090102 A1 * | 5/2004 | Tame et al. | 297/378.12 |
| 2004/0217638 A1 * | 11/2004 | Shao | 297/378.14 |
| 2004/0239168 A1 | 12/2004 | Persad et al. | |
| 2004/0262969 A1 * | 12/2004 | Sasaki et al. | 297/344.11 |
| 2005/0046261 A1 * | 3/2005 | Grable et al. | 297/378.1 |

* cited by examiner

VEHICLE SEAT ASSEMBLY HAVING WALK-IN AND FOLD-FLAT FEATURES

BACKGROUND OF THE INVENTION

1. Field of the Invention

The invention relates to vehicle seat assemblies including seat assemblies having both a walk-in (also known as easy entry) and a fold-flat feature.

2. Background Art

A vehicle seat assembly having walk-in feature and fold-flat features is disclosed herein. Examples of vehicle seats are disclosed in U.S. Pat. Nos. 7,021,716; 6,926,364; 6,827,404; 5,161,856; and 4,909,570.

SUMMARY OF THE INVENTION

Under the invention, a vehicle seat assembly is provided. In a first embodiment, the vehicle seat assembly comprises a seat bottom that is slidably mounted to a floor of a vehicle. A slide lock mechanism associated with the seat bottom locks and releases the seat bottom to slide. The slide lock mechanism may be biased towards a locked condition. A seat back may be pivotally mounted to the seat bottom. A pivot lock mechanism may be associated with the seat back for locking and releasing the seat back to pivot. The pivot lock mechanism may be biased towards a locked condition. A walk-in pivot release actuator may be connected to the pivot lock mechanism and may be configured to unlock the pivot lock mechanism when actuated. A fold-flat pivot release actuator may be connected to the pivot lock mechanism and may be configured to unlock the pivot lock mechanism when actuated. A blocking member may be mounted proximate the seat bottom. The blocking member may be configured to move between a first position, a second position and a neutral position, the neutral position being disposed between the first and second positions. The blocking member may be connected to the slide lock mechanism and also to the fold-flat pivot release actuator. The seat back may engage the blocking member and may move the blocking member from the neutral position to the first position when the walk-in pivot release actuator is actuated and the seat back pivots forward. The blocking member may obstruct further forward pivot of the seat back and may also unlock the slide lock release mechanism when the blocking member is in the first position. The fold-flat release actuator may move the blocking member from the neutral position to the second position when the fold-flat release actuator is actuated. The blocking member may be further configured to avoid obstructing the seat back from pivoting forward when the blocking member is in the second position.

In at least one implementation of the first embodiment, the vehicle seat assembly further comprises a remote walk-in pivot release actuator and a first linking member connecting the remote walk-in pivot release actuator to the walk-in pivot release actuator. The vehicle seat assembly further comprises a second linking member connecting the blocking member to the slide lock mechanism. The remote walk-in pivot release actuator may be mounted to the seat back and the blocking member may be mounted to the seat bottom. The first and second linking members may each comprise a cable that is slidably disposed within a sleeve such that the cables move within their respective sleeves when pulled. The walk-in pivot release actuator may be mounted to an inboard surface of an outboard portion of the seat bottom.

In at least another implementation of the first embodiment, the blocking member may be mounted to an inboard surface of an outboard portion of the seat bottom. In at least one variation of this implementation, the vehicle seat assembly may further comprise an elongate bar having first and second ends. The elongate bar may be attached at the first end to the blocking member and the second end of the elongate bar may protrude through an outboard surface of the seat bottom. The fold-flat pivot release actuator may be mounted to an outboard surface of the seat bottom and the fold-flat pivot release actuator may be operatively connected to the blocking member through a connection to the second end of the elongate bar. In a further variation of this implementation, the vehicle seat assembly may further comprise a cover plate attached to the second end of the elongate bar and the fold-flat pivot release actuator may be connected to the cover plate. The vehicle seat assembly may further comprise a spring that connects the fold-flat pivot release actuator to the cover plate. In some implementations, the spring may be a clock spring mounted proximate the second end of the elongate bar. In other implementations, the fold-flat pivot release actuator may have a downwardly projecting portion and the cover plate may have an upwardly projecting portion. The clock spring may operatively connect the downwardly projecting portion of the fold-flat pivot release actuator to the upwardly projecting portion of the cover plate.

In at least another implementation, the vehicle seat back portion may have a downwardly projecting protrusion. The blocking member may have an upwardly projecting protrusion. The seat back may engage the blocking member through contact between the downwardly projecting protrusion of the seat back and the upwardly projecting protrusion of the blocking member. In at least another implementation, the blocking member may be a plate that lies substantially entirely within a plane containing the downwardly projecting protrusion of the seat back portion.

In at least another implementation of the first embodiment, the blocking member may pivot between the first position, the second position and the neutral position.

In at least another implementation of the first embodiment, the seat back may pivot between a nominal operating position and a fold-flat position wherein the seat back is disposed at a predetermined angle with respect to the seat bottom when in the nominal operating position, wherein a substantial portion of the seat back is disposed substantially adjacent to the seat bottom when in the fold-flat position, and wherein the forward pivot of the seat back may cause the blocking member to release the slide-lock mechanism when the seat back is at an angle of between 30 to 35 degrees from the nominal operating position. In at least one variation, the seat back may cause the blocking member to release the slide-lock mechanism when the seat back is at an angle of approximately 33 degrees from the nominal operating position. In at least another variation of this implementation, the seat back may be at an angle of between 50 to 60 degrees from the nominal operating position when the blocking member is in the first position. In a further variation of this implementation, the seat back may be at an angle of approximately 56 degrees from the nominal operating position when the blocking member is in the first position.

In at second embodiment, a vehicle seat assembly having a walk-in feature and a fold-flat feature is provided. The vehicle seat assembly may comprise a seat bottom that is slidably mounted to a floor of a vehicle by a plurality of rails. A slide lock mechanism may be attached to the seat bottom for locking and releasing the seat bottom to slide on the rails. The slide lock mechanism may be biased towards a locked condition. A seat back may be pivotally mounted to the seat bottom. A pivot lock mechanism may be associated with the seat back for locking and releasing the seat back to pivot. The pivot lock mechanism may be biased towards a locked condition. A walk-in pivot release actuator may be connected to the pivot lock mechanism and may be configured to unlock the pivot lock mechanism when actuated. A fold-flat pivot release actuator may be connected to the pivot lock mechanism and may be configured to unlock the pivot lock mechanism when actuated. A blocking plate may be mounted proximate the seat bottom. The blocking plate may be configured to pivot between a first position, a second position, and a neutral position, the neutral position being disposed between the first and second positions. The blocking plate may be connected to the slide lock mechanism and also to the fold-flat pivot release actuator. The seat back may engage the blocking plate and may move the blocking plate from the neutral position to the first position when the walk-in pivot release actuator is actuated and the seat back pivots forward. The blocking plate may obstruct further forward pivot of the seat back and may unlock the slide lock release mechanism when the blocking plate is in the first position. The fold-flat release actuator may move the blocking plate from the neutral position to the second position when the fold-flat release actuator is actuated. The blocking may be further configured to avoid obstructing the seat back from pivoting forward when the blocking plate is in the second position.

In at least one implementation of the second embodiment, the vehicle seat assembly further comprises a remote walk-in pivot release actuator and a first linking member connecting the remote walk-in pivot release actuator to the walk-in pivot release actuator. The vehicle seat assembly may further comprise a second linking member connecting the blocking plate to the slide lock mechanism. The remote walk-in pivot release actuator may be mounted to the seat back and the blocking plate may be mounted to the seat bottom.

In a third embodiment, a vehicle seat assembly having a walk-in feature and a fold-flat feature is provided. The vehicle seat assembly may comprise a seat bottom that is slidably mounted to a floor of a vehicle by a plurality of rails. A slide lock mechanism may be attached to the seat bottom for locking and releasing the seat bottom to slide on the rails. The slide lock mechanism may be biased towards a locked condition. A seat back may be pivotally mounted to the seat bottom. A pivot lock mechanism may be associated with the seat back for locking and releasing the seat back to pivot. The pivot lock mechanism may be biased towards a locked condition. A walk-in pivot release actuator may be mounted to an inboard surface of an outboard portion of the seat back. The walk-in pivot release actuator may be connected to the pivot lock mechanism and may be configured to release the pivot lock mechanism when actuated. A fold-flat pivot release actuator may be attached to an outboard surface of an outboard portion of the seat bottom. The fold-flat pivot release actuator may be connected to the pivot lock mechanism and may be configured to release the pivot lock mechanism when actuated. A blocking plate may be mounted to an inboard surface of an outboard portion of the seat bottom. The blocking plate may be configured to pivot between a first position and a second position and a neutral position. The neutral position may be disposed between the first and second positions. The blocking plate may be operatively connected to the slide lock mechanism and also operatively connected to the fold-flat pivot release actuator. The seat back may engage the blocking plate and may pivot the blocking plate from the neutral position to the first position when the walk-in pivot release actuator is actuated and the seat back pivots forward. The blocking plate may obstruct further forward pivot of the seat back and may unlock the slide lock release mechanism when the blocking plate is in the first position. The fold-flat release actuator may pivot the blocking plate from the neutral position to the second position when the fold-flat release actuator is actuated. The blocking plate may be further configured to avoid obstructing the seat back from pivoting forward when the blocking plate is in the second position.

DETAILED DESCRIPTION OF THE PREFERRED EMBODIMENT(S)

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

FIGS. 1 through 4 illustrate a vehicle seat assembly 20 in various configurations. Vehicle seat assembly 20 includes a seat back 22 and a seat bottom 24. Seat bottom 24 may be adapted to be mounted to the floor of a vehicle (not shown) through a rail assembly 26. Vehicle seat assembly 20 may slide in a forward or rearward direction on rail assembly 26. Seat back 22 may be pivotally mounted to seat bottom 24. In a nominal operating position, seat back 22 is disposed at an angle of approximately 25 degrees from a vertical orientation. The angle of seat back 22 with respect to seat bottom 24 is adjustable. Seat back 22 may also fold over seat bottom 24 to a fold-flat position, shown in phantom lines in FIG. 1, that is substantially adjacent to seat bottom 24. A back portion of seat back 22 may serve as additional cargo space when seat back 22 is in the fold-flat position.

Figures 1, 2, 3, 4:
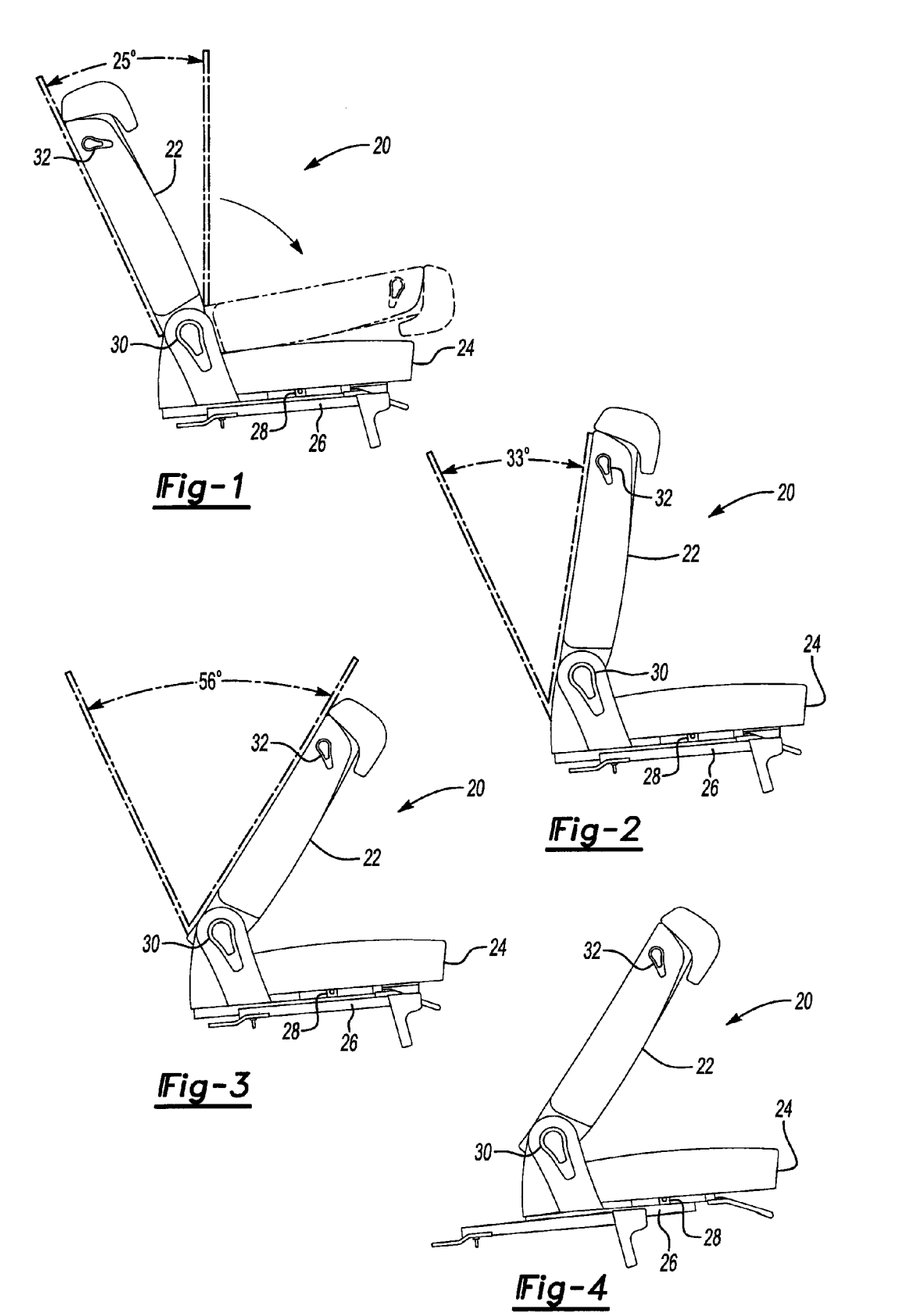
FIGS. 1 through 4 are side elevational views of an embodiment of the vehicle seat assembly of the present invention in various stages of fold-flat and walk-in operations.

As illustrated in FIGS. 2 through 4, vehicle seat assembly 20 may be equipped with a walk-in feature which allows seat back 22 to be pivoted forward to a predetermined angular orientation and slid in a forward direction to allow a passenger easier access to an area behind vehicle seat assembly 20. Rail assembly 26 includes a slide lock mechanism 28 to allow a user to selectively lock or unlock rail assembly 26 and thus allow the vehicle seat assembly 20 to slide in a forward or rearward direction. Vehicle seat assembly 20 may also include a pivot lock mechanism 30 that allows a user to selectively enable and inhibit seat back 22 to pivot with respect to seat bottom 24. A remote walk-in pivot release actuator 32 may be mounted to an upper portion of seat back 22 to allow a user to actuate the walk-in feature from outside of the vehicle. Remote walk-in pivot release actuator 32 may be mounted elsewhere on seat back 22 or on vehicle seat assembly 20.

FIG. 2 illustrates the vehicle seat assembly 20 after actuation of the walk-in feature. Seat back 22 has pivoted approximately 33 degrees from the nominal operating position. When seat back 22 has reached a predetermined angular position such as this, the slide lock mechanism 28 may be released permitting vehicle seat assembly 20 to slide forward on rail assembly 26. In some embodiments, vehicle seat assembly 20 may include a spring or springs that would automatically move vehicle seat assembly 20 in the forward direction upon the release of slide lock mechanism 28. In other embodiments, a user may need to push vehicle seat assembly 20 in a forward direction.

FIG. 3 illustrates vehicle seat assembly 20 with seat back 22 pivoted to a predetermined maximum angular position with respect to seat bottom 24. During operation of the walk-in feature, seat back 22 may be inhibited from pivoting in the forward direction beyond this predetermined maximum angular position. In some embodiments, the maximum pivot will be between 51 and 61 degrees forward of its nominal operating position. In other embodiments, vehicle seat assembly will stop at approximately 56 degrees forward of its nominal operating position.

FIG. 4 depicts vehicle seat assembly 20 as it moves forward along rail assembly 26 after actuation of the walk-in feature.

Figures 5, 6, 7:
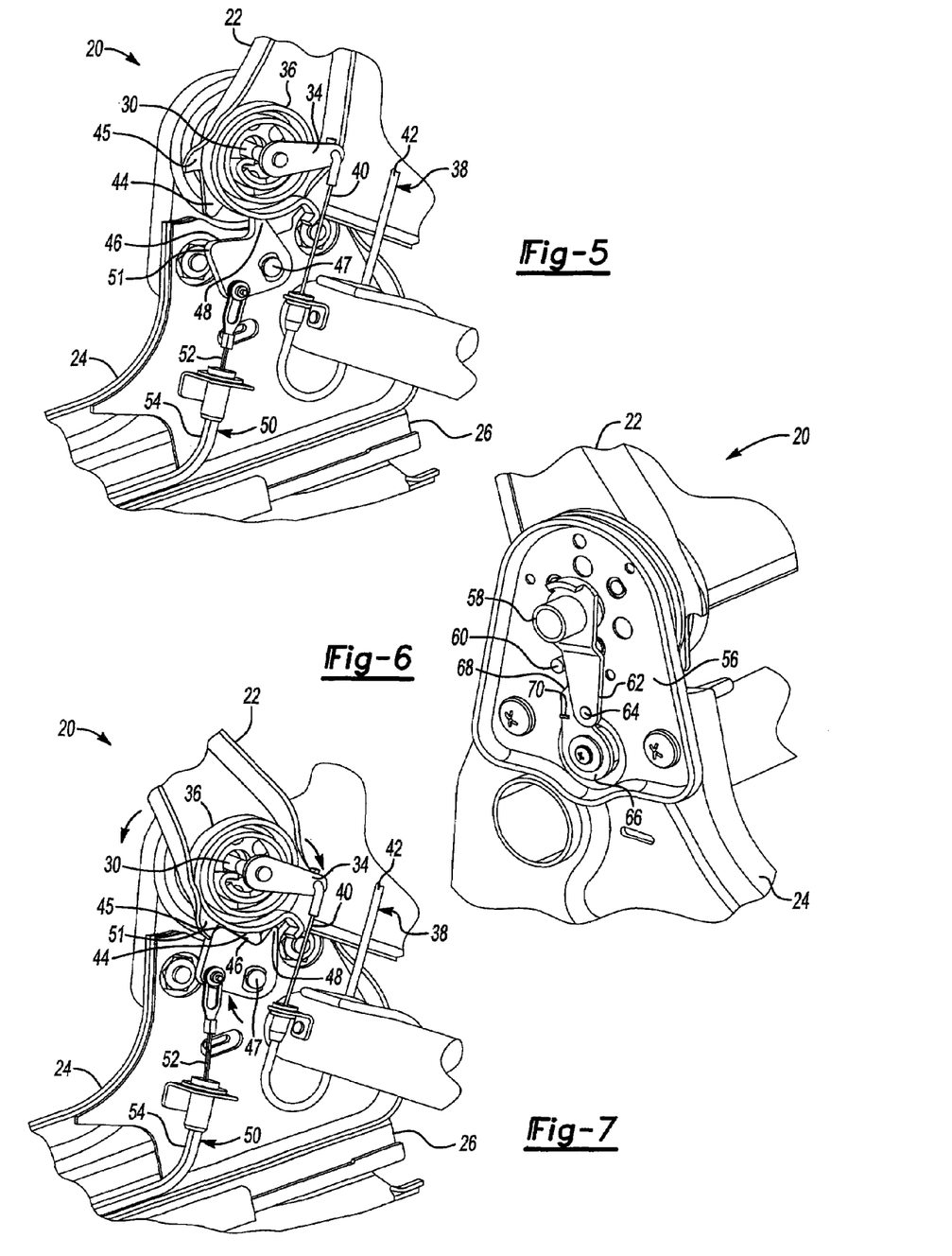
FIG. 5 is a fragmented perspective view of an inboard surface of an outboard portion of the vehicle seat assembly of FIGS. 1-4, illustrated without cushion or fabric cover, prior to actuation of the walk-in feature.
FIG. 6 is a fragmented perspective view of an outboard surface of the outboard portion of the vehicle seat assembly of FIG. 5 prior to actuation of the walk-in feature.
FIG. 7 is a fragmented perspective view of the vehicle seat assembly illustrated in FIG. 5 after actuation of the walk-in feature.

FIG. 5 is a fragmented view depicting an inboard surface of an outboard portion of vehicle seat assembly 20, including a portion of seat back 22, seat bottom 24, rail assembly 26 and pivot lock mechanism 30. Walk-in pivot release actuator 34 may be connected to pivot lock mechanism 30 and may be configured to rotate in a clockwise direction. In other embodiments, walk-in release actuator may be configured to rotate in a counter-clockwise direction. As walk-in pivot release actuator 34 rotates in a clockwise direction, pivot lock mechanism 30 may be released, freeing seat back 22 to pivot. In the illustrated embodiment, a clock spring 36 causes the seat back 22 to pivot forward automatically upon the release of pivot lock mechanism 30. A first linking member or first Bowden cable 38 may be connected at a first end to walk-in pivot release actuator 34. First Bowden cable 38 includes a wire portion 40 and a sleeve portion 42. The wire portion 40 may be slidably mounted within sleeve portion 42. A second end of first Bowden cable 38 may be connected to remote walk-in pivot release actuator 32. When remote walk-in pivot release actuator 32 is actuated, it pulls on wire portion 40 which, in turn, slides with respect to sleeve portion 42 and pulls walk-in pivot release actuator 34, thus releasing pivot lock mechanism 30 and causing seat back 22 to pivot forward. Linkages other than first Bowden cable 38, including connecting rods and/or wires, may be used to remotely actuate walk-in pivot release actuator 34.

Figures 8, 9, 10:
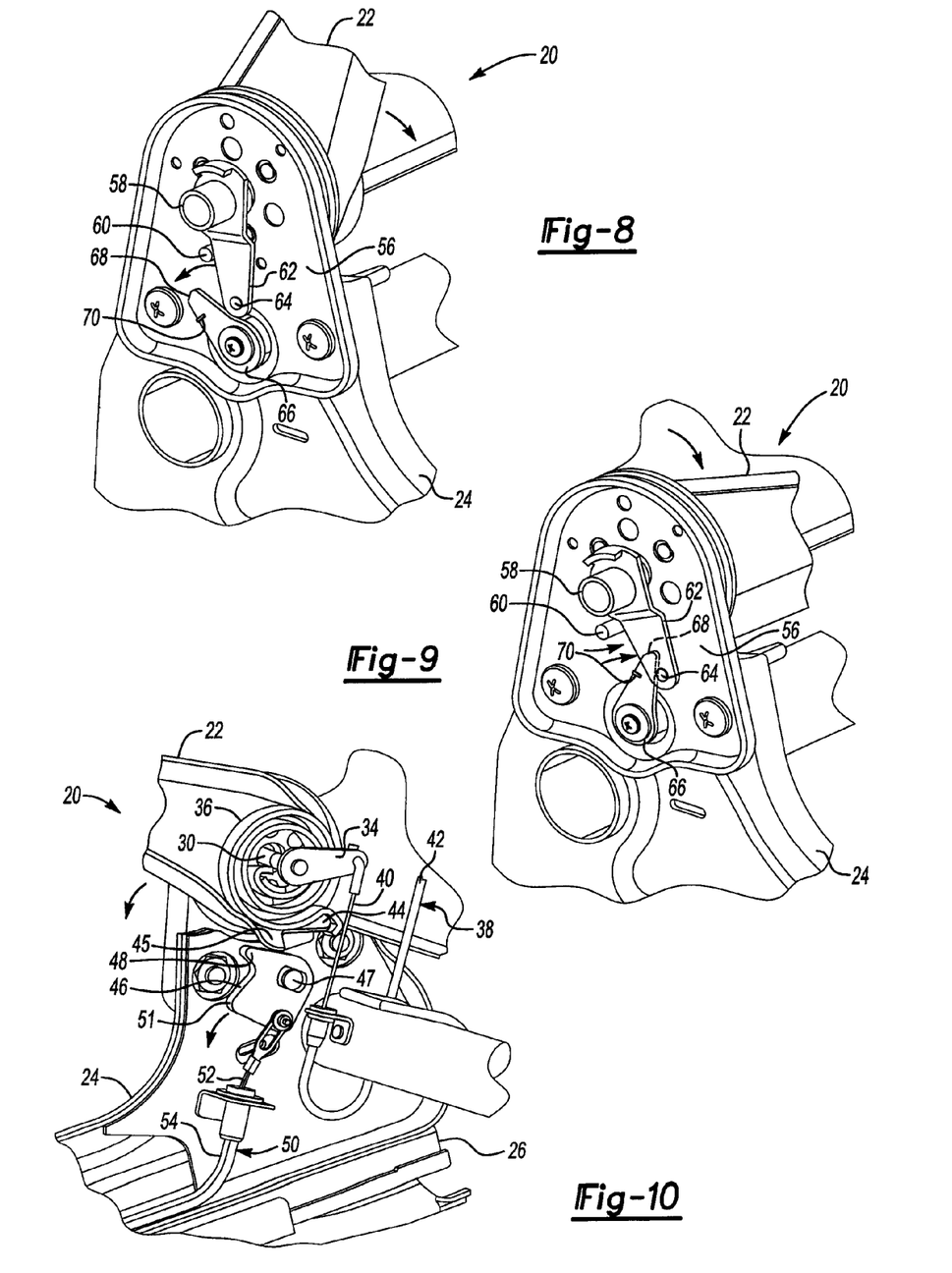
FIG. 8 is a fragmented perspective view of the vehicle seat assembly of FIG. 6 after actuation of the walk-in feature.
FIG. 9 is a fragmented perspective view of the vehicle seat assembly illustrated in FIG. 6 after actuation of the fold-flat feature.
FIG. 10 is a fragmented perspective view of the vehicle seat assembly depicted in FIG. 5 after actuation of the fold-flat feature.

Seat back 22 may include a downwardly projecting portion 44 projecting in a downward direction. As seat back 32 pivots forward in a counterclockwise direction, downwardly projecting portion 44 rotates in a counterclockwise direction towards a rear portion of seat assembly 20. A blocking member 46 is pivotably mounted by a pivotal connector 47 to seat bottom 24 proximate a lower portion of seat back 22. Blocking member 46 rotates between a first position (as shown in FIG. 7), a neutral position (as shown in FIG. 5) and a second position (as shown in FIG. 10). In the embodiment illustrated in FIG. 5, the first position is clockwise of the neutral position and the second position is counter-clockwise of the neutral position. In other embodiments, the orientation can be reversed. Blocking member 46 includes a projection 48 which projects in a generally upward direction from blocking member 46. Projection 48 may be disposed in the same plane as downwardly projecting portion 44 and on the path followed by downwardly projecting portion 44 as downwardly projecting portion 44 rotates in a counterclockwise direction. Downwardly projecting portion 44 may engage or push projection 48 causing block member 46 to move towards the first position.

A second linking member or second Bowden cable 50 may be attached to seat bottom 24. Second Bowden cable 50 may include a wire portion 52 and a sleeve portion 54. A first end of wire portion 52 may be connected to blocking member 46. As blocking member 46 pivots about pivotal connector 47, blocking member 46 may pull on the first end of wire portion 52. A second end of second Bowden cable 50 is attached to the slide lock mechanism 28. As blocking member 46 pivots towards the first position, the wire portion 52 may be tensed and pulls on the slide lock mechanism 28, releasing it and permitting vehicle seat assembly 20 to slide along rail assembly 26. Blocking member 46 may be configured to pivot in the clockwise direction no further than the first position. When blocking member 46 stops pivoting at the first position seat back 22 may stop pivoting in the forward direction because it may be obstructed by blocking member 46.

Figure 13:
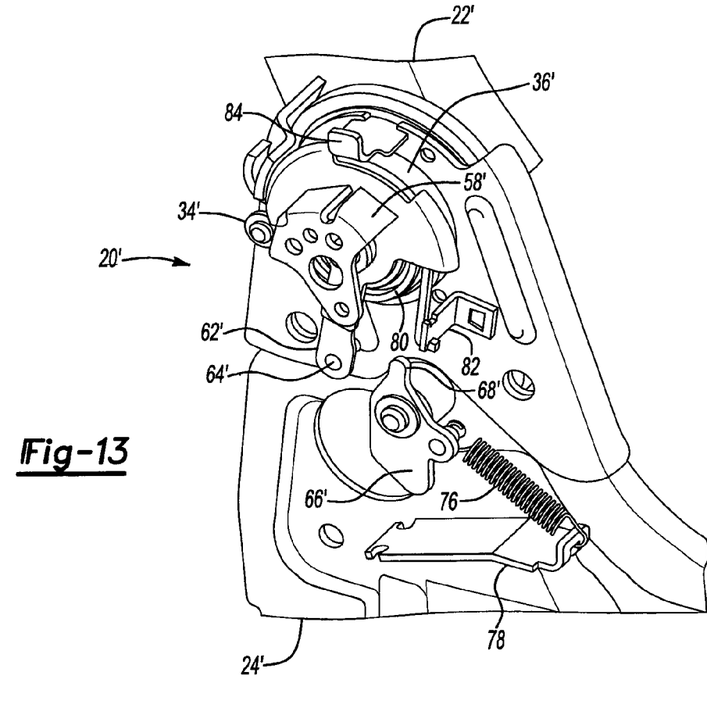
FIG. 13 is a fragmented perspective view of an outboard surface of the outboard portion of the vehicle seat assembly of FIG. 12 prior to actuation of either the walk-in feature or the fold-flat feature.

FIG. 6 illustrates an outboard surface of the vehicle seat assembly 20 depicted in FIG. 5. Intermediate cover plate 56 covers pivot lock mechanism 30 and various portions of seat back 22 and seat bottom 24. A fold-flat actuator 58 may be connected to pivot lock mechanism 30. In some embodiments, an operator handle (not shown) may be attached to fold-flat actuator 58 to facilitate the actuation of fold-flat actuator 58. Fold-flat actuator 58 is may be configured to rotate in a counterclockwise direction (with respect to FIG. 6). Peg 60 may obstruct clockwise rotation of fold-flat actuator 58 beyond a predetermined position. Fold-flat actuator 50 includes a downwardly projecting portion 62 and a peg 64 projecting from downwardly projecting portion 62 in an inboard direction. An elongate bar 49 (see FIG. 11) may be connected to an outboard surface of blocking member 46 and protrudes through an outboard surface of seat bottom 24. Cover plate 66 may be connected to elongate bar 49 and is thus connected to blocking member 46. As blocking member 46 pivots clockwise towards the rear of vehicle seat assembly 20, cover plate 66 pivots counter-clockwise towards the rear of vehicle seat assembly 20. Cover plate 66 may include an upwardly projecting portion 68 that may be disposed substantially adjacent to downwardly projecting portion 62 and which may be in contact with peg 64. Peg 64 may obstruct cover plate 66 from rotating clockwise. In other embodiments, downwardly projecting portion 62 may directly engage upwardly projecting portion 68 without the use of peg 64 by being disposed in the same plane as upwardly projecting portion 68. Clock spring 70 (as best shown in FIG. 13) may be mounted around elongate bar 49 and may connect the upwardly projecting portion 68 of cover plate 66 with a downwardly projecting portion 62 of fold-flat actuator 58.

FIG. 7 illustrates the portion of vehicle seat assembly 20 depicted in FIG. 5 after actuation of the walk-in feature. In this view, wire portion 40 has pulled walk-in pivot release actuator 34 in the clockwise direction (with respect to FIG. 5) thus releasing pivot locking mechanism 30. Clock spring 36 has caused seat back 22 to pivot in the forward direction as illustrated. Downwardly projecting portion 44 has engaged projection 48 and has moved blocking member 46 into the first position. Blocking member 46 cannot rotate beyond the first position and consequently, projection 48 prevents seat back 22 from pivoting further forward through engagement with downwardly projecting portion 44. In some embodiments, blocking member 46 may include an engagement end 51 which engages a second downwardly projecting portion 45 of seat back 22 which, when blocking member 46 is in the first position, may prevent any further forward pivot of seat back 22. The movement of blocking member 46 towards the first position has pulled on wire portion 52 of second Bowden cable 50 thus releasing slide lock mechanism 28. With slide lock mechanism 28 released, vehicle seat assembly 20 is free to move forward on rail assembly 26.

FIG. 8 depicts the outboard portion of vehicle seat assembly 20 depicted in FIG. 7 after actuation of the walk-in feature. Seat back 22 has pivoted to a predetermined forward position and cover plate 66 has rotated towards the rear portion of vehicle seat assembly 20. Despite the tension exerted on clock spring 70 by the rotation of cover plate 66, fold-flat actuator 58 does not rotate towards the rear of vehicle seat assembly 20 due to the obstruction caused by peg 60.

FIG. 9 depicts the portion of vehicle seat assembly 20 illustrated in FIG. 6 after actuation of the fold-flat feature. Fold-flat actuator 58 has rotated counter-clockwise towards the front of vehicle seat assembly 20. This motion releases pivot lock mechanism 30 which permits seat back 22 to pivot forward. The counter-clockwise rotation of fold-flat actuator 58 has also caused the rotation of cover plate 66 towards the front of vehicle seat assembly 20.

FIG. 10 depicts the portion of vehicle seat assembly 20 illustrated in FIG. 5 after actuation of the fold-flat feature. Seat back 22 has pivoted forward to the fold-flat position. The forward rotation of cover plate 66 has caused blocking member 46 to rotate to the second position. With blocking member 46 in the second position, projection 48 has moved out of the path of downwardly projecting portion of seat back 44 thus permitting seat back 22 to pivot unobstructed towards the fold-flat position.

Figure 11:
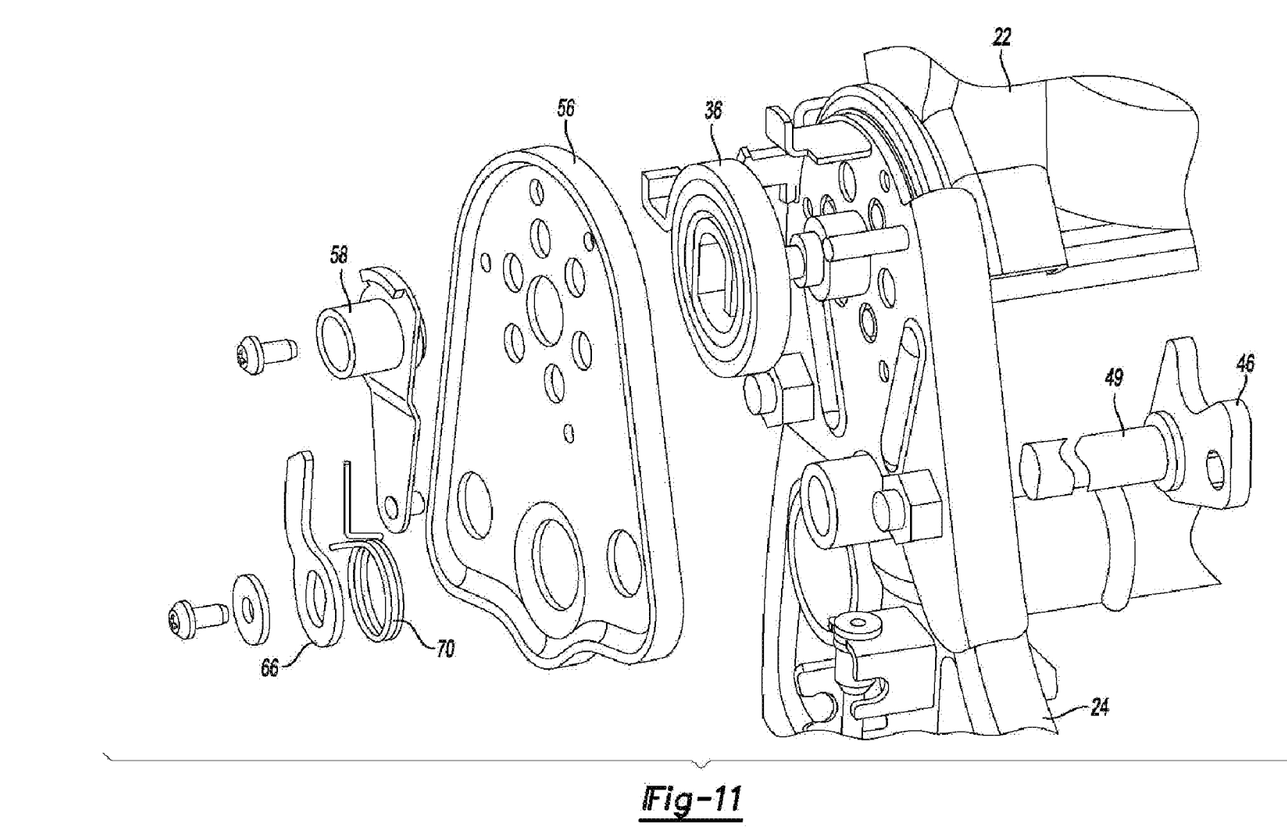
FIG. 11 is an exploded view of the vehicle seat assembly depicted in FIGS. 5-10.

FIG. 11 is an exploded view illustrating the portion of vehicle seat assembly 20 depicted in FIG. 6 and illustrating the arrangement of the various components.

Figure 12:
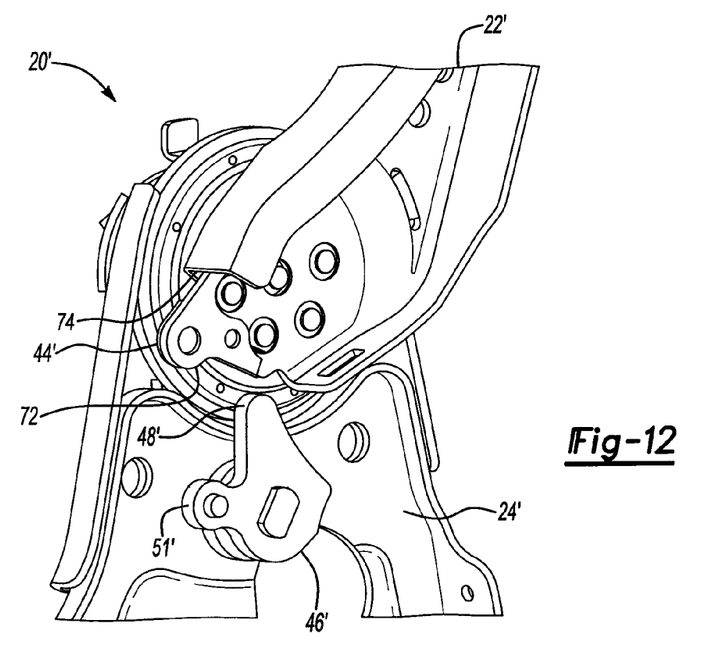
FIG. 12 is a fragmented perspective view of an inboard surface of an outboard portion of a second embodiment of the vehicle seat assembly illustrated in FIGS. 1-4 prior to actuation of either the walk-in feature or the fold-flat feature.
Figure 14:
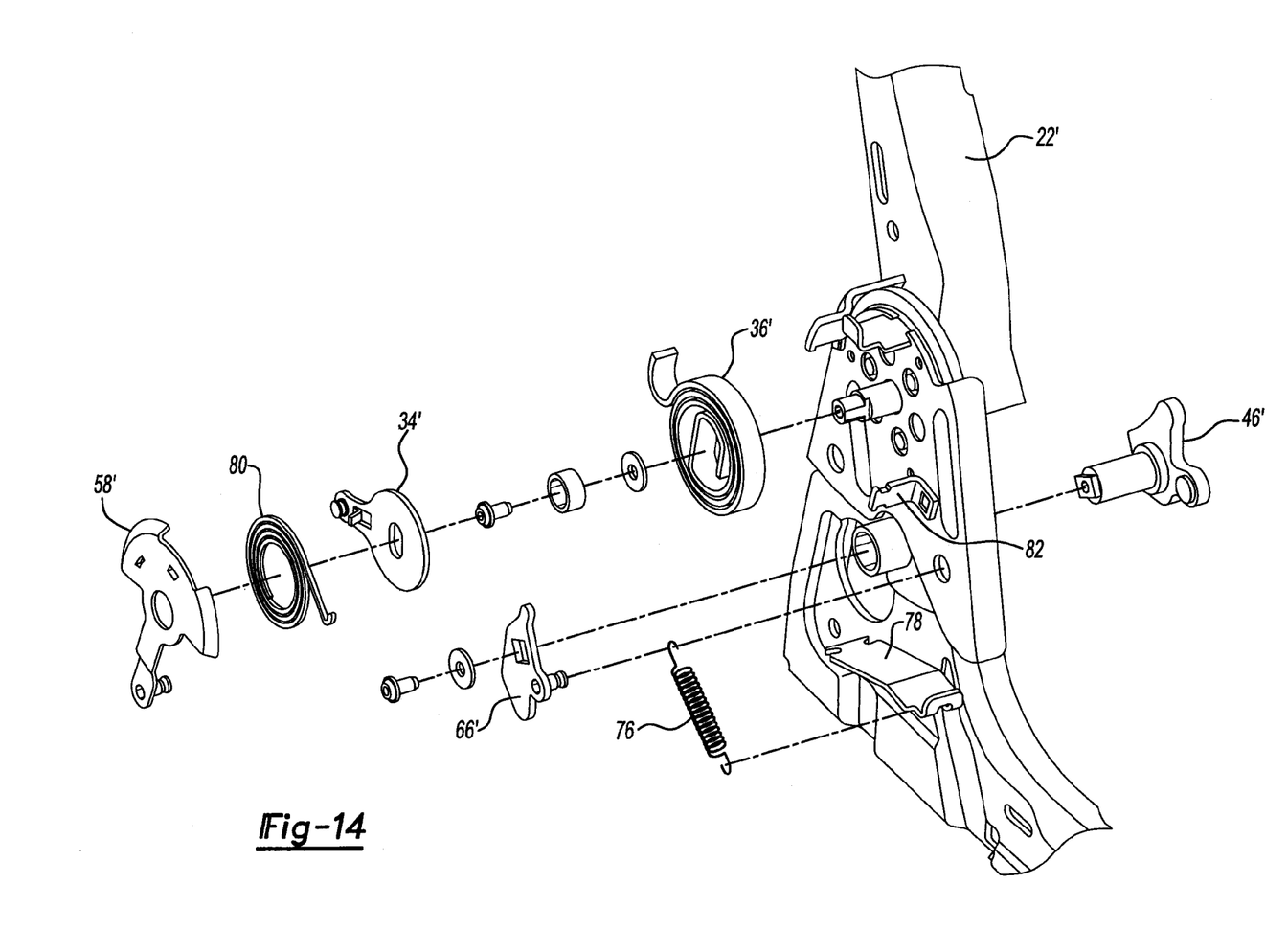
FIG. 14 is an exploded view of the vehicle seat assembly depicted in FIGS. 12-13.

A second embodiment of the vehicle seat assembly 20 is illustrated in FIGS. 12-14. Parts and components of the second embodiment that are similar or identical in function to corresponding parts of the first embodiment illustrated in FIGS. 5-11 are given the same reference numerals with a prime notation. FIG. 12 illustrates an inboard surface of an outboard portion of a vehicle seat assembly 20' configured in accordance with the second embodiment. The seat back portion 22' is pivotally connected to a seat bottom portion 24'. In this second embodiment, seat back 22' is equipped with an engaging plate 72 and an engaging flange 74. Engaging plate 72 is mounted over downwardly projecting portion 44' of seat back 22'.

When the walk-in feature is activated, engaging plate 72 contacts a projection portion 48' of blocking member 46' and pushes blocking member 46' in a clockwise direction (with respect to FIG. 12) until blocking member 46' reaches a stop position. When blocking member 46' is in the stop position, engaging flange 74 engages an engagement end 51' of blocking member 46'. The engagement of engaging flange 74 and engagement end 51' together with the engagement of engagement plate 72 and projection 48' holds seat back 22' at a forward angle to facilitate an occupant's ingress into an egress from a portion of a passenger compartment of a vehicle equipped with vehicle seat assembly 20'.

FIG. 13 illustrates the outboard surface of the outboard portion of the vehicle seat assembly 20' of FIG. 12. To activate the walk-in feature of vehicle seat assembly 20', walk-in pivot release actuator 34' is actuated by rotating it in the counter-clockwise direction (with respect to FIG. 13) by, example, pulling on it using a Bowden cable (not shown). When walk-in pivot release actuator 34' is actuated, seat back 22' is unlocked and rotates in a clockwise direction (with respect to FIG. 13) under the force exerted by clock spring 36'. The clockwise rotation of seat back 22' causes the engagement between engaging plate 72 and projection 48' described above. Cover plate 66' is connected by spring 76 to spring anchor 78. Spring 76 and spring anchor 78 cooperate to bias cover plate 66' in the orientation illustrated in FIG. 13. Cover plate 66' is connected to blocking member 46' such that as blocking member 46' rotates towards the rear of vehicle seat assembly 20', cover plate 66' also rotates towards the rear of vehicle seat assembly 20'. The counterclockwise rotation (with respect to FIG. 13) of cover plate 66' is obstructed when upwardly projecting portion 68' engages peg 64' of downwardly projecting portion 62'. Fold-flat actuator 58' is prevented from rotating in the clockwise direction (with respect to FIG. 13) by a fold-flat actuator stop 84. Fold-flat actuator 58' is biased against fold-flat actuator stop 84 by fold-flat actuator spring 80. Fold-flat actuator 58' prevents cover plate 66' from further rotation towards the rear of vehicle seat assembly 20 and also prevents further rotation of blocking member 46' towards the rear of vehicle seat assembly 20'.

To actuate the fold-flat operation of vehicle seat assembly 20', a user rotates fold-flat actuator 58' in the counterclockwise direction (with respect to FIG. 13). A portion of fold-flat actuator 58' engages and rotates the walk-in pivot release actuator 34' unlocking pivot lock mechanism 30' (not shown) and causing seat back 22' to pivot forward under the force of clock spring 36'. As fold-flat actuator 58' rotates in the counterclockwise direction (with respect to FIG. 13), peg 64' of downwardly projecting portion 62' engages with upwardly projecting portion 68' of cover plate 66' causing cover plate 66' to rotate in a clockwise direction (with respect to FIG. 13). As cover plate 66' rotates, blocking member 46' is rotated towards the front of vehicle seat assembly 20' (in a counter-clockwise direction with respect to FIG. 12). As blocking member 46' rotates, projection 48' moves out of the path of engaging plate 72 and engaging flange 74. This allows seat back 22' to rotate until it has folded flat against seat bottom 24'.

FIG. 14 is an exploded view illustrating the arrangement of the assembly illustrated in FIGS. 12 and 13.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly comprising:
   a seat bottom;
   a seat back pivotally disposed on the seat bottom;
   a pivot lock mechanism associated with the seat back for locking and releasing the seat back to pivot;
   a walk-in pivot release actuator connected to the pivot lock mechanism;
   a fold-flat pivot release actuator connected to the pivot lock mechanism; and
   a blocking member mounted proximate the seat bottom, the blocking member being configured to move between a first position, a second position and a neutral position disposed between the first and second positions, wherein in the first position the blocking member obstructs further forward pivoting of the seat back and in the second position the blocking member allows forward pivoting of the seat back when the walk-in pivot release actuator and the fold-flat release actuator are actuated;
   wherein the seat back causes the blocking member to release a slide lock mechanism when the seat back is at a predetermined angle.

2. The vehicle seat assembly of claim 1 further comprising:
   a remote walk-in pivot release actuator;
   a first linking member connecting the remote walk-in pivot release actuator to the walk-in pivot release actuator; and
   a second linking member connecting the blocking member to a slide lock mechanism;
   wherein the remote walk-in pivot release actuator is mounted to the seat back and wherein the blocking member is mounted to the seat bottom.

3. The vehicle seat assembly of claim 2 wherein the first and second linking members each comprise a cable.

4. The vehicle seat assembly of claim 1 wherein the walk-in pivot release actuator is mounted to the seat bottom.

5. The vehicle seat assembly of claim 1 wherein the blocking member is mounted to the seat bottom.

6. The vehicle seat assembly of claim 1 further comprising an elongate bar having first and second ends, the elongate bar being attached at the first end to the blocking member and the fold flat pivot release actuator being operatively connected to the blocking member through a connection to the second end.

7. The vehicle seat assembly of claim 6 further comprising a cover plate attached to the second end of the elongate bar, the fold-flat pivot release actuator being connected to the cover plate.

8. The vehicle seat assembly of claim 7 further comprising a spring connecting the fold-flat pivot release actuator to the cover plate.

9. The vehicle seat assembly of claim 8 wherein the spring is mounted proximate the second end of the elongate bar.

10. The vehicle seat assembly of claim 1 wherein the blocking member is connected to the slide lock mechanism and to the fold-flat pivot release actuator, and wherein the seat back actuates the blocking member from the neutral position to the first position when the walk-in pivot release actuator is actuated and the seat back pivots forward.

11. The vehicle seat assembly of claim 1 wherein the seat back portion has a downwardly projecting protrusion, and the blocking member has an upwardly projecting protrusion, the seat back engaging the blocking member through contact between the downwardly projecting protrusion of the seat back and the upwardly projecting protrusion of the blocking member.

12. The vehicle seat assembly of claim 1 wherein the blocking member obstructs further forward pivoting of the seat back and unlocking of a slide lock release mechanism when the blocking member is in the first position.

13. The vehicle seat assembly of claim 1 wherein the blocking member pivots between the first position, the second position and the neutral position.

14. The vehicle seat assembly of claim 1 wherein the fold-flat release actuator moves the blocking member from the neutral position to the second position when the fold-flat release actuator is actuated.

15. The vehicle seat assembly of claim 1 wherein the blocking member is pivotally disposed on the seat bottom.

16. The vehicle seat assembly of claim 1 wherein the seat back is at an angle of between 50 and 60 degrees from a nominal operating position when the blocking member is in the first position.

17. The vehicle seat assembly of claim 16 wherein the seat back is at an angle of approximately 56 degrees from the nominal operating position when the blocking member is in the first position.

18. A seat assembly comprising:
    a seat bottom;
    a slide lock mechanism attached to the seat bottom for locking and releasing the seat bottom;
    a seat back pivotally mounted to the seat bottom;
    a pivot lock mechanism associated with the seat back for locking and releasing the seat back;
    a walk-in pivot release actuator connected to the pivot lock mechanism and configured to unlock the pivot lock mechanism when actuated;
    a fold-flat pivot release actuator connected to the pivot lock mechanism and configured to unlock the pivot lock mechanism when actuated; and
    a blocking member mounted proximate the seat bottom, the blocking member being configured to pivot between a first position, a second position and a neutral position between the first and second positions, the blocking member being connected to the slide lock mechanism and to the fold-flat pivot release actuator, wherein in the first position the blocking member obstructs further forward pivoting of the seat back and wherein the seat back actuates the blocking member from the neutral position to the first position when the walk-in pivot release actuator is actuated and the seat back pivots forward.

19. The seat assembly of claim 18 wherein the blocking member obstructs further forward pivoting of the seat back and unlocking of the slide lock release mechanism when the blocking member is in the first position.

20. A seat assembly comprising:
    a seat bottom;
    a seat back pivotally mounted to the seat bottom;
    a pivot lock mechanism associated with the seat back;
    a walk-in pivot release actuator configured to release the pivot lock mechanism;
    a fold-flat pivot release actuator configured to release the pivot lock mechanism; and
    a blocking member configured to move between a first position, a second position and a neutral position disposed between the first and second positions;
    wherein in the first position the blocking member obstructs further forward pivoting of the seat back and in the second position the blocking member allows forward pivoting of the seat back and wherein the seat back actuates the blocking member from the neutral position to the first position when the walk-in pivot release actuator is actuated and the seat back pivots forward.

* * * * *

UNITED STATES PATENT AND TRADEMARK OFFICE
CERTIFICATE OF CORRECTION

| | | |
|---|---|---|
| PATENT NO. | : 7,819,479 B2 | Page 1 of 1 |
| APPLICATION NO. | : 11/870069 | |
| DATED | : October 26, 2010 | |
| INVENTOR(S) | : Michael Halbig et al. | |

It is certified that error appears in the above-identified patent and that said Letters Patent is hereby corrected as shown below:

Column 9, Line 11, Claim 1:

Delete "mounted" and insert -- disposed --.

Signed and Sealed this

Twenty-first Day of December, 2010

David J. Kappos
*Director of the United States Patent and Trademark Office*